Figure 1:
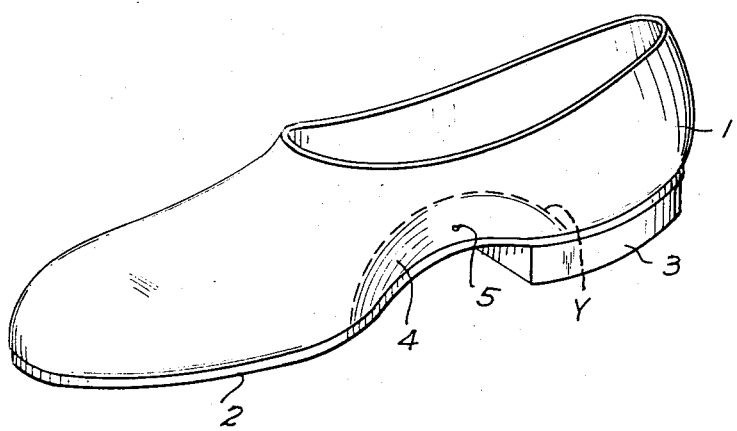

INVENTORS
ELIAS W. R. HAIN
ROBERT R. COSNER
RUDOLF G. BRAUTIGAM
BY George A Skoler
ATTORNEY INVENTORS
ELIAS W. R. HAIN
ROBERT R. COSNER
RUDOLF G. BRAUTIGAM
BY George A Skoler
ATTORNEY 3,355,535
PROCESS FOR PRODUCING A SHOE-UPPER
Elias W. R. Hain, Charleston, and Robert R. Cosner, South Charleston, W. Va., and Rudolf G. Brautigam, Elmhurst, N.Y., assignors to Union Carbide Corporation, a corporation of New York
Filed Dec. 13, 1963, Ser. No. 330,382
7 Claims. (Cl. 264—321)

This invention relates to the manufacture of shoe-uppers in a single step operation. More particularly, this invention relates to the pressure shaping of extensible material to form a shoe-upper.

Heretofore, the manufacture of even the simplest designed shoe-uppers required a multiplicity of labor and time consuming steps. In the usual case, leather or leather replacement materials and other components which form the shoe-upper must be cut from a pattern, after which these parts are marked and skived to allow stitching of the various flat sheet materials. The cut, marked and skived shoe-upper materials are thereafter typically stitched together, after which it is mulled. This involves steam moisturizing the shoe-upper materials. The moistened shoe-upper is thereafter pulled over and attached to a shoe-last by several methods known in the art of shoemaking. Upon drying, the lasted shoe-upper conforms to the particular shape of the last or will retain the particular shoe-upper size, shape or design. Even this simplified version of making a shoe-upper involves the utilization of considerable labor, handling and time, and these factors represent a considerable portion of the cost in making shoes.

It is provided herein a process which eliminates much of the time and labor heretofore employed in the manufacture of a shoe-upper. The process of this invention allows for a substantially one-step shaping of materials into the complete shoe-upper shape. This process eliminates the cutting of shoe-upper materials into several parts which subsequently have to be stitched together for the mulling and lasting steps in order to obtain a fully-shaped shoe-upper.

The process of this invention is accomplished, broadly speaking, by pressure shaping a solid, extensible material, i.e., a material capable of expansion, into the shape of a shoe-upper. In effect, the process of this invention involves the application to a sheet of the material of a force which is sufficient to conform said sheet to the shape of a cavity having the substantial configuration of a shoe-upper.

The process of this invention involves placing at least a portion of a surface of a sheet of the solid, extensible material over at least a substantial portion of the opening of the cavity (usually concave) having the shape of a shoe-upper. The surfaces of the cavity are defined by solid, essentially non-extensible material, that is, material capable of withstanding a substantial force without expansion. The cavity possesses an axis determined as a line extending from the center of the opening to the cavity to a point on the surface of the cavity, determined as that point on the surface of the cavity which represents the maximum total distance obtainable of all lines extending from the perimeter of the opening to a point on the surface of the cavity. The surfaces of the cavity defined by the aforementioned non-extensible material extend from the point in a direction lateral of the axis and thereafter rise to the perimeter of the opening in a direction non-converging with said axis. Thereafter, an amount of force and heat is applied to the material sufficient to cause the sheet of the material to conform to the configuration of the cavity. That is, the sheet is forced into the cavity and along the walls of the surfaces of the cavity. The conformed sheet is maintained within the cavity for a period of time sufficient to provide, upon withdrawal of the sheet from the cavity, the sheet in the shape of a shoe-upper defined by the cavity.

The aforementioned cavity may also be characterized as having the shape of a shoe-upper, being defined by surfaces of solid, essentially non-extensible material and being further defined by a multiplicity of planes, each parallel to the plane of the opening. The planes in the cavity are bound by the solid, substantially non-extensible material and extend from the bottom surfaces defining the cavity to the cavity opening. Moreover, each of the planes in the cavity in sequence from the bottom surfaces to the opening has a cross-sectional area at least as great as the preceding plane.

A significant facet of the instant invention resides in the ready ability to force the solid, extensible material into the cavity for proper shaping and the ready ability to withdraw the shaped material from the cavity. This is achieved by providing that no surface of the cavity possesses a re-entrant slope or angle. In other words, the cavity is devoid of re-entering angles to the general concavity of the cavity and, therefore, there is no abutment impeding the forceful insertion of the sheet along the whole of the cavity wall or surfaces, nor impeding the withdrawal of the shaped sheet from the cavity. So long as the shaped material is prevented from sticking to the cavity wall or surfaces, it may be withdrawn from the cavity without any substantial distortion, temporary or otherwise, of its shape.

However, such a cavity mold design, from first impressions, would appear most unsatisfactory for shoe-upper manufacture. A shoe possesses an arch at one side of the shoe-upper at the vicinity of its waist. The arch represents an indentation in the shoe-upper which conforms to the general shape of the arch of the foot. The arch adds considerable wearing comfort to the shoe and its absence would greatly detract from the pleasure one obtains from a shoe. However, the arch indentation in a shoe-upper provides a re-entering angle to the contour of the shoe-upper and thus, any effort to mold a shoe-upper possessing that re-entering angle would be difficult and expensive, if successful at all.

Thus, it is necessary to avoid, in the manufacture of shoe-uppers in accordance with the process of this invention, the shaping of the extensible material in a cavity which possesses the typical re-entering angle to the contour of the shoe-upper which would have to be present to provide the indented arch portion of the usual shoe-upper. It has been surprisingly found that if the cavity possesses the reverse and mirror-image of the arch portion of the shoe-upper in the cavity design, then there will be no re-entering angles in the cavity. Moreover, the resulting shaped product can be handled to convert the reverse and mirror-image of the arch portion of the shoe-upper by simply applying pressure to the reversed arch or by turning the shaped product inside-out, thereby forcing the material to attain the normal indented re-entry shape of the arch of the shoe-upper.

To better illustrate this concept of the instant invention, it is necessary to make recourse to FIGURE 1 of the drawing.

FIGURE 1 illustrates a three-quarter view of a conventional shoe. Shoe-upper 1 is suitably fixed to sole 2 which, in turn, has attached thereto heel 3. In a lower side waist portion of shoe-upper 1 is arch 4 which represents that space confined between dotted lines Y and sole 2. It is to be noted that arch 4 has a re-entering angle with respect to the general geometric configuration of shoe-upper 1. However, the initial shoe-upper, which is made in accordance with the process of this invention, does not possess an indented arch representative of a re-entering angle to the contour of the shoe-upper, as defined in FIGURE 1. This distinction is more specifically illustrated in FIGURE 2 which characterizes a three-quarter view of a shoe-upper as obtained from the shaping process of this invention.

Figure 2:
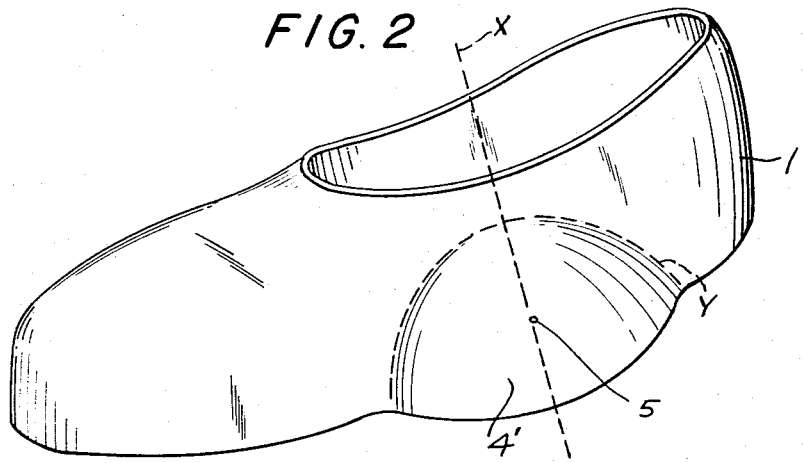

Shoe-upper 1 of FIGURE 2 possesses reverse mirror-image arch 4' and is, therefore, free of the indented arch illustrated for arch 4 of FIGURE 1. Arch 4' of FIGURE 2 represents the mirror-image of the indented arch of FIGURE 1. That is to say, arch 4' of FIGURE 2 extends outwardly from the configuration of the contour of the shoe-upper, whereas arch 4 of FIGURE 1 extends inwardly of the configuration of the shoe-upper and is thus a re-entering angle. In addition, the angle of slope of arch 4' of FIGURE 2, as it extends from dotted line Y outwardly of shoe-upper 1, is essentially the same as the angle of arch 4 of FIGURE 1, except that the direction of the angle with respect to an axis, defined by vertical line X tangent to the surface of shoe-upper 1 at dotted line Y and traverses arch 4', is opposite to that of arch 4 of FIGURE 1.

Arch 4' of FIGURE 2 can be converted to provide an indented arch 4, such as illustrated in FIGURE 1, by simply applying pressure at point 5 of FIGURE 2. The amount of pressure should be sufficient to cause the totality of arch 4' to assume the indented configuration that is possessed by arch 4 of FIGURE 1. It is not necessary, pursuant to the scope of this invention, that on indentation of arch 4' of FIGURE 2, that the indentation be a permanent configuration. All that is necessary is that the shoe-upper be capable of being indented as described above so that when the material is fixed to an innersole and sole, utilizing, e.g., conventional shoe manufacturing techniques, the indentation can be caused to remain in a fixed state.

The shoe-uppers of this invention are manufactured from pressure shaping, as indicated previously, of a solid, extensible material. It is highly preferred that the extensible material be pervious to air and water-vapor. Moreover, the material should be capable of absorbing moisture, though this is not a critical requirement.

The term "extensible," as employed herein, means that the material is expandable by application of a force to at least one surface thereof so as to increase the area of the surface. Moreover, the material should possess sufficient properties to maintain the shape caused by expansion, and for this reason, the material should be "permanently extensible." In other words, the material should not retract after expansion to the shape of the cavity.

Broadly illustrative of permanently extensible material include, for example: leather; reconstituted leather; leather and fabric laminates; woven and non-woven fabrics; heat deformable elastomers and extensible plastic sheets not normally pervious but capable of being so made by extraction of solvent soluble solid components from the elastomer or plastic; foams and foam-fabric laminates; paper or paper-fabric combinations; and the like.

Particularly desirable materials which may be molded in accordance with the process of this invention to form desirable shoe-uppers are solid, semi-flexible and flexible plastic foams. Particularly desirable foams are those which possess a substantially open cell structure. That is, the walls of most of the cells of the foam, and preferably all of the cells, are open to adjacent cells and the cells are defined by a network or interlinking struts. The struts may possess webs of plastic which are formed at the junctures of the struts to provide a small film which partially, and with some cells, totally encloses the open area between the joined struts. These plastic foams possess significant porosity to air and water-vapor and liquid-water. By incorporation of such foams into the process and apparatus of this invention, it is possible to compress such material to form permanently compressed products having porosity to air and water-vapor and absorbency to liquid-water. Illustrative of such foam materials include, e.g., the semi-flexible and flexible poly(vinyl chloride) foams, and the semi-flexible and flexible polyurethane foams. Particularly preferred are the polyurethane foams. These foams are typically produced by the reaction of a polyisocyanate and a compound containing at least two active hydrogens, as determined from the Zerewitinoff method, Journal of American Chemical Society, Vol. 49, page 3181 (1927).

The flexible polyurethane foams are typically made utilizing polyisocyanates which possess at least two isocyanato groups each bonded to a carbon atom of an organic radical. The isocyanate may contain 3, 4 or more isocyanato groups. Illustrative of such compounds are, e.g., aliphatic, cycloaliphatic and aromatic isocyanates. A significant list of such compounds is disclosed in Siefken, Annalen 562, pages 122 to 135 (1949). Illustrative of particularly desirable polyisocyanates include the following:

tolylene-2,4- and
2,6-diisocyanate,
4,4'-methylene-di-ortho-tolylisocyanate,
2,4,4'-triisocyanatodiphenylether,
toluene-2,3,6-triisocyanate,
1-methoxy-2,4,6-benzenetriisocyanate,
meta-phenylenediisocyanate,
4-chloro-meta-phenylenediisocyanate,
4,4'-biphenyldiisocyanate,
1,5-naphthalenediisocyanate,
1,4-tetramethylenediisocyanate,
1,6-hexamethylenediisocyanate,
1,10-decamethylenediisocyanate,
1,4-cyclohexanediisocyanate,
1,2-ethylenediisocyanate,
diphenylmethane-p:p'- or m:m'-diisocyanate,
bis(4-isocyanatocyclohexyl)methane,
stilbene diisocyanates,
dixylylmethane diisocyanates,
2,2-bis(4-isocyanatophenyl)propane,
diphenylmethane tetraisocyanates,
trimethylbenzene triisocyanates,
ditolylmethane triisocyanates,
triphenylmethane triisocyanates,
3,3'-dimethyldiphenylene-4,4'-diisocyanate,
3,3'-dimethoxy-diphenylene-4,4'-diisocyanate,
diphenyl triisocyanates and
diphenylcyclohexane-p:p'-diisocyanate.

The preferred isocyanates are the tolylene diisocyanates and the diphenyl methane diisocyanates.

The active hydrogen-containing compounds which are suitable co-reactants with the organic polyisocyanates to form the polyurethane foams of this invention include, e.g., organic polyols and organic polyesters possessing residual hydroxyl groups.

Illustrative organic polyols are those compounds which possess at least two free hydroxyl groups bonded to a carbon atom of the organic radical. Preferably, the hydroxyl groups are bonded to different carbon atoms of the radical. Illustrative of such organic polyols are, e.g., the alkane diols, alkane triols, alkane tetrols, alkane pentols, alkane hexols, and the like; ether alcohols such as polyalkylene oxide diols, triols, tetrols, hexols, and the like; aromatic polyhydroxy compounds such as mono-, di-, tri-, tetra, and other multi-aromatic nuclei-containing compounds possessing at least two hydroxyl groups bonded directly to a carbon atom of an aromatic nucleus and/or to a polyvalent organic radical which is jointly bonded to at least one hydroxyl group and an aromatic nucleus.

Illustrative polyols which may be utilized in the process of this invention include, e.g., mono-, di-, tri-, and tetra-alkylene glycols of from 2 to 8 carbon atoms per alkylene moiety such as ethylene, propylene, butylene, pentylene, and the like glycols. Inclusive of some of these polyols are polyols having a molecular weight of at least 100 which are characterized by the formula:

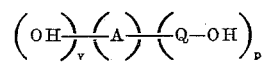

wherein A may be a radical such as

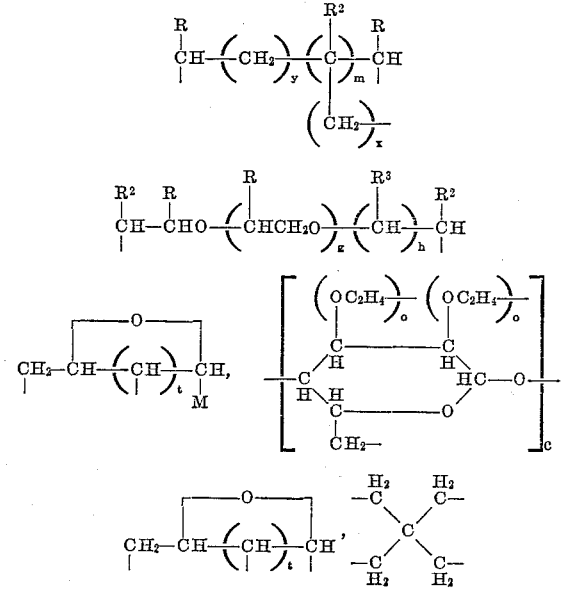

and

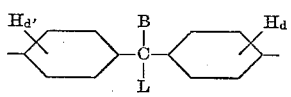

Q is bonded to A by an ether (—O—) bridge of an oxyalkylene radical and is at least one oxyalkylene radical, preferably at least two recurring oxaylkylene radicals, said oxyalkylene moieties having from 2 to 18 carbon atoms, preferably from 2 to 8 carbon atoms; $p$ is an integer of at least 1, preferably equal to the free valence of the radical A and is typically an integer of from 1 to 10; $v$ is an integer equal to the free valence of the radical A minus the value of $p$ and typically is a value of from 0 to 4; each R, $R^2$ and $R^3$ may be one of hydrogen, an alkyl group of from 1 to 18 carbon atoms, preferably from 1 to 4 carbon atoms, cycloalkyl of from 5 to 7 carbon atoms, or an aryl group; $y$ is an integer of from 0 to 10; $m$ is an integer of from 0 to 8; $g$ can be an integer of from 1 to 10; $h$ can be an integer of from 1 to 8; $x$ is one of the integers 0 or 1; $t$ is an integer of from 2 to 4; $c$ is an number having an average value of at least 2; M is a radical which can be alkyl, aralkyl,

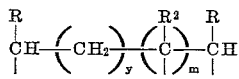

or

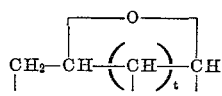

$o$ is one of the integers 0 or 1; B is hydrogen or an alkyl group of from 1 to 4 carbon atoms; L is B or

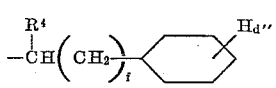

wherein the free valence of

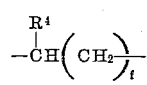

is the valence bond of L; $d$, $d'$ and $d''$ are each equal to 4 or 10; $f$ is either a value of 0 or 1; and $R^4$ is methyl when $f$ is 0 and hydrogen when $f$ is 1.

Illustrative of polyols encompassed by the above formula are those formed by the addition of alkylene oxides to an initiating polyhydroxy substituted organic compound in which the hydroxy substituents are bonded to carbon of the organic compound.

The result of such addition forms a hydroxylated alkylene oxide adduct of said hydroxy substituted organic compound. Thus, various 1,2-alkylene oxides such as ethylene oxide, 1,2-propylene oxide, 1,2-butylene oxide, 1,2-hexylene oxide, 1,2-dodecylene oxide, cyclohexyl ethylene oxide, and styrene oxide, or mixtures thereof, may be polymerized by contact with a basic or acidic catalyst in the presence of the initiating polyhydroxy organic compound. The aforementioned 1,2-alkylene oxides may be copolymerized with 1,3- and 1,4-alkylene oxides by acid catalytic polymerization in the presence of the initiating polyhydroxy organic compound. Illustrative of various 1,3- and 1,4-alkylene oxides include, 1,3-propylene oxide, 1,4-butylene oxide (tetrahydrofuran), 1,4-pentylene oxide, 1,4-octylene oxide, etc., and 1,4-epoxy-2-phenyl butane, and the like. The 1,3- and 1,4-alkylene oxides may be reacted alone with the initiating hydroxy compound to form useful polyols.

The initiating polyhydroxy organic compound may be any one of the polyols previously described and include, 1,2-alkylene glycol, 1,3-alkylene glycol, 1,4-alkylene glycol, alkylene triols, alkylene tetrols, alkylene pentols, alkylene hexols, polyalkylene glycols, etc. Illustrative of these materials include, ethylene glycol, 1,2- and 1,3-dihydroxy propane, 1,2- 1,3-, 1,4-dihydroxy butane, 1,2-, 1,3-, 1,4-dihydroxy pentane, 1,2-, 1,3-, 1,4-dihydroxy hexane, 1,2-, 1,3-, 1,4-dihydroxy decane, 1,2-, 1,3-, 1,4-dihydroxy octadecane, and the alpha, omega diols of the above hydrocarbon moieties not indicated as such. Polyalkylene glycols include, diethylene glycol, triethylene glycol, tetraethylene glycol, 1,2- and 1,3-dipropylene glycol, 1,2- and 1,3-tripropylene glycol, 1,2-, 1,3- and 1,4-dibutylene glycol, 1,2-, 1,3-, and 1,4-tributylene glycol, etc. Triols which may be utilized as the initiating hydroxy organic compound include, glycerol, 1,1,1-trimethylolpropane, 1,2,3-trihydroxy butane, 1,2,3-trihydroxy pentane, 1,2,3-trihydroxy octane, 1,2,3-trihydroxy decane, 1,2,4-trihydroxy butane, 1,2,4-trihydroxy hexane, 1,2,6-trihydroxy hexane, 1,2,8-trihydroxy octane, and the like. Illustrative of other polyols which are suitable initiators include, sorbitol, pentaerythritol, erythritol, aromatic hydroxy compounds of the formulae:

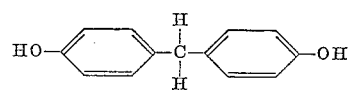

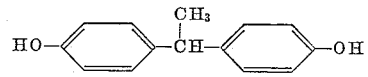

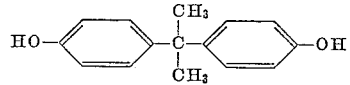

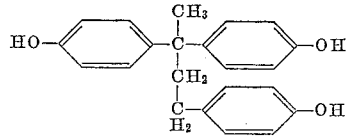

and the like, and the saturated (non-benzenoid) derivatives thereof; various other carbohydrates such as the monosaccharides and polysaccharides, e.g., cellulose; starch; glucosides, such as the lower alkyl (1 to 6 carbon atoms) glucosides, e.g., methyl-D-arabinoside, methyl-D-xyloside, ethyl-D-xyloside, n-butyl-D-riboside, methyl, ethyl, propyl, butyl, and 2-ethylhexyl-D-glycoside, 2-ethylhexyl-D-fructoside, isobutyl-D-mannoside, ethyl-D-galactoside, benzyl-D-glucoside and methyl-L-rhammoside; sucrose; glycose glycoside; maltose; lactose; D-gulose; D-idose; hydroxyethyl cellulose; amylose; amylopectin; dextrin; and the like.

Desirably, the initiator is admixed with the alkylene oxide in a liquid phase and the basic or acidic catalyst is dispersed throughout this phase. Suitable basic catalysts include alkali metal hydroxides such as sodium hydroxide and potassium hydroxide. Desirable acidic catalysts include, e.g., Lewis acids such as boron trifluoride, aluminum chloride, and the like. The catalyst is added in catalytic amounts, i.e., amounts sufficient to effect reaction between the alkylene oxide and the initiating hydroxylated compound. When the catalyst is alkali metal hydroxide, amounts of from about 0.2 to 1.0 percent by weight of the alkylene oxide reactant is convenient. When the catalyst is a Lewis acid such as boron trifluoride, amounts of from about 0.01 to 1.0 percent by weight of the alkylene oxide reactant is suitable. The reaction can be effected at temperatures of from about 80° C. to about 160° C. and advantageously under pressures ranging from about 5 to 50 pounds per square inch gauge. The reaction is preferably carried out under essentially moisture free (anhydrous) conditions to minimize side reaction. The addition of the alkylene oxide is terminated when the calculated quantities thereof have been introduced into the system.

Illustrative organo polyesters which possess residual hydroxyl groups may be branched and/or linear. Branched-chain polyesters include those which are of the cross-linked variety. Moreover, the term "polyester" is meant to include polyesteramides which possess not only recurring ester linkages, but also recurring amide linkages. Such polyesters and polyesteramides are obtained by the reaction of an organic polycarboxylic acid and an organic polyol and/or an organic hydroxyl amine, or from polymerization of an alpha, omega-hydroxyorganocarboxylic acids and/or the corresponding alpha, omega-organolactone, e.g., epsilon caprolactone.

Illustrative of the polycarboxylic acids include, e.g., oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, muconic acid, alpha-dihydromuconic acid, beta-dihydromuconic acid, diglycolic acid, dilactic acid, thiodigylcolic acid, 4-amyl-2,5-heptadienedioic acid, 3-hexynedioic acid, 1,2 - cyclohexanedicarboxylic acid, 1,4-cyclohexanedicarboxylic acid, phthalic acid, isophthalic acid, terephthalic acid, tetrahydrophthalic acid, tetrachlorophthalic acid, 1,8-naphthalenedicarboxylic acid, 3 - carboxycinnamic acid, 1,2-naphthalenedicarboxylic acid, 1,1,5-pentanetricarboxylic acid, 1,2,4 - hexanetricarboxylic acid, 2-propyl-1,2,4-pentanetricarboxylic acid, 1,2,3-propanetricarboxylic acid, 1,2,4-benzenetricarboxylic acid, 1,3,5-benzenetricarboxylic acid, 3-hexene-1,2,3,4-tetracarboxylic acid, 1,2,3,4-benzenetetracarboxylic acid, 1,2,3,5 - benzenetetracarboxylic acid, benzenepentacarboxylic acid, benzenehexacarboxylic acid, and the like.

The anhydride and acyl halides of the above polycarboxylic acids may also be employed when such are available. The polyols which may be reacted with the polycarboxylic acids to form the polyesters include, for example, the aforementioned alkylene oxide adducts of initiating polyhydroxy organic compounds or the aforementioned polyhydroxylated organic compounds per se. Hydroxy amines which may be employed include, ethanol amine, 3-aminopropanol, 4-aminopropanol, 5-aminopentanol, 6-aminohexanol, 10-aminodecanol, 6-amino-5-methyl hexanol-1, p-hydroxymethylbenzylamine, and the like.

Reaction between the polyisocyanates and the active hydrogen-containing organic compounds may be effected at temperatures ranging from 0° C., to 250° C. preferably from 25° C., to 150° C. The reaction is effected by intermixture of the components of the reaction, followed by heating of the mixture, if necessary.

The molecular weight and the hydroxyl number of the polyol when used for reaction with a polyisocyanate to form polyurethane foams will determine whether the resulting foam product is flexible or rigid. For example, the above polyols which possess a hydroxyl number of from about 200 to about 1000 are typically employed in rigid foam formulations, while those polyols having a hydroxyl number of from about 20 to about 200 or more are usually employed in semi-flexible and flexible foam formulations. Such limits are not intended to be restrictive and are merely illustrative of the potential selectivity of the above polyol coreactants. Other modifications of possible polyol combinations will be readily apparent to those having ordinary skill in the art.

The hydroxyl number, as used hereinabove, is defined by the equation:

$$OH = \frac{f \times 1000 \times 56.1}{\text{molecular weight}}$$

wherein OH is the hydroxyl number of the polyol, $f$ represents functionality (i.e., average number of hydroxyl groups per molecule of polyol), and molecular weight is the average molecular weight of the polyol.

Methods for making the aforementioned polyurethane flexible foams are well documented in the art.

When preparing the foamed products, either the quasi-prepolymer technique or the one-shot technique can be employed. Both techniques are known in the art.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-hydroxyl reaction, or by a combination of the two methods. All of these methods are known in the art. The preferred blowing agents are certain halogen-substituted aliphatic hydrocarbons which have boiling points of between about −40° C. and 70° C., and which vaporize at or below the temperature of the foaming mass. These blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1,1,1-trifluoro-2-chloroethane, 1-chloro-1-fluoroethane, 1,1,1-trichloro-2,2,2-trifluoroethane, 1,1,2-trichloro-1,2,2-trifluoroethane, 1-chloro-2-fluoroethane, 2-chloro-1,1,1,2,3,3,4,4,4-nonafluorobutane, hexafluorocyclobutane, and octafluorocyclobutane.

Other useful blowing agents include, low-boiling hydrocarbons such as butane, pentane, hexane, cyclohexane, and the like. Many other compounds easily volatilized by the exotherm of the isocyanate-hydroxyl reaction can also be employed. A further class of blowing agents includes themally-unstable compounds which liberate gases upon heating, such as N,N'-dimethyl-N,N'-dinitrosoterephthalamide.

The amount of blowing agent used will vary with the density desired in the foamed product. In general, it may be stated that for 100 grams of reaction mixture containing an average NCO/OH ratio of about 1:1, about 0.005 to 0.3 moles of gas are used to provide foams having densities ranging from 30 to 0.8 pounds per cubic foot, respectively.

A conventional catalyst can be employed in the reaction mixture for accelerating the isocyanate-hydroxyl reaction. Such catalysts include a wide variety of compounds such as, for example, (a) tertiary amines such as trimethylamine, 1,2,4-trimethylpiperazine, 1,4-dimethylpiperazine, N-methylmorpholine, N-ethylmorpholine, N,N-dimethylbenzylamine, bis(dimethylaminomethyl)amine, N,N-dimethylethanolamine, N,N,N',N'-tetramethyl-1,3-butanediamine, triethanolamine, 1,4-diazabicyclo[2.2.2]octane, and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethylacetoacetate, salicylaldehyde, cyclopentanone-2-carboxylate, acetylacetoneimine, bis-acetylacetonealkylenediamines, salicylaldehydeimine, and the like, with various metals such as Be, Mg, Zn, Cd, Pb, Ti, Zr, Sn, Sb, As, Bi, Cr, Mo, Mn, Fe, Co, Ni, or such ions as $MoO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of these alcoholates with carboxylic acids, beta-diketones and 2-(N,N-dialkylamino) alkanols, such as the well-known chelates of titanium obtained by said or equivalent procedures; (g) salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous 2-ethylhexanoate, stannous oleate, lead octoate, metallic driers such as manganese and cobalt naphthenate, and the like; (h) organometallic derivatives of tetravalent tin, trivalent and pentavalent As, Sb and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyl-bis[4 - (N,N' - dimethylamino)benzoate], dibutyltin - bis [6-(N-methylamino)caproate] and the like. Similarly, there can be used a trialkyltin hydroxide, dialkyltin oxide, dialkyltin dialkoxide, or dialkyltin dichloride. Examples of these compounds include, trimethyltin hydroxide, tributyltin hydroxide, trioctyltin hydroxide, dibutyltin oxide, dioctyltin oxide, dilauryltin oxide, dibutyltin-bis(isopropoxide, dibutyltin-bis(2-diethylaminopentylate), dibutyltin dichloride, dioctyltin dichloride, and the like.

The tertiary amines may be used as primary catalysts for accelerating the active hydrogen-isocyanate reaction or as secondary catalysts in combination with metal catalysts. The catalysts are employed in small amounts, for example, from about 0.001 percent to about 5 percent, based on the weight of the reaction mixture.

It is also desirable to employ small amounts, e.g., about 0.001 percent to 5.0 percent by weight, based on the total reaction mixture of an emulsifying agent such as siloxane-oxyalkylene block copolymer having from about 10 to 80 percent by weight of alkylene oxide polymer, such as the block copolymers described in United States Patent Numbers 2,834,748 and 2,917,480.

Another class of useful emulsifiers are the "non-hydrolyzable" polysiloxane-polyoxyalkylene block copolymers. This class of compounds differs from the above mentioned polysiloxane-polyoxyalkylene block copolymers in that the polysiloxane moiety is bonded to the polyoxyalkylene moiety through direct carbon to silicon bonds, rather than through carbon to oxygen to silicon bonds. The copolymers generally contain from 5 to 95 weight percent, and preferably from 5 to 50 weight percent of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer to a temperature sufficient to cause the polysiloxane polymer and the salt to react to form the block copolymer. Although the use of an emulsifier is desirable to influence the type of foam structure that is formed, the foam products of the invention can be prepared without emulsifiers in some cases.

The flexible open-cell polyurethane foams suitable in this invention may have a density ranging from about 0.8 pound per cubic foot, and lower, up to about 2.5 pounds per cubic foot, and higher. A significant facet of this invention involves the compression of a foam which possesses porosity to air, water-vapor, and liquid-water into the shape of a shoe-upper as defined herein.

These foams may be utilized alone or in combination with a variety of fabrics such as fabrics made from cotton, nylon (e.g., polyhexamethylene adipamide and polycaprolactam); polyester fibers such as polyethylene terephthalate, commercially available under the trademark "Dacron" and "Terylene"; polyacrylonitrile-polyvinylchloride copolymers such as those commercially available under the trademark "Dynel"; cellulose triacetate fibers, polyvinylchloride-polyvinylidenechloride copolymers, such as those available under the trademark "Saran," and the like.

The foam may be bonded, with or without resinous binders (adhesives), to the fabric to combine the two in the form of a laminate. A multiplicity of layers of each may be employed in the formation of the laminate. Illustrative resins include, resinous binders such as natural or synthetic rubbers, e.g., styrene-butadiene copolymers, styrene-butadiene-acrylonitrile terpolymers or butadiene-acrylonitrile copolymers. In addition, these rubbers may be employed as a latex emulsion. Most significantly desirable are poly(vinyl chloride) resins or plastisols, or polyacrylates, such as, poly(2-ethylhexylacrylate-ethylacrylate) copolymers per se or as a latex; and the like.

Other resinous binder compositions, e.g., vinyl resins or thermoplastic and thermosetting condensation type resins, may be employed. For example, there may be employed homopolymers and copolymers of vinyl chloride, vinylidene chloride, vinyl acetate, vinyl alcohol, vinyl butyrate, vinyl propionate, butadiene, acrylic acid esters, and the like. More specifically, such homopolymers and copolymers of the vinyl type include, e.g., poly(vinyl chloride) resins and plastisols; poly(vinylidene chloride); copolymers of vinylidene chloride and vinyl chloride; homopolymers of vinyl acetate and copolymers or terpolymers of vinyl acetate and vinyl chloride and/or vinylidene chloride; homo-, co- and terpolymers of polyethylene, polypropylene, and the previously defined vinyl monomers; association products of polyacrylic acids and poly(ethylene oxide); copolymers of maleic acid or maleic acid esters with vinylidene or vinyl compounds such as ethylene, vinyl chloride, vinylidene chloride and/or butadiene; copolymers of butadiene and acrylonitrile, copolymers of acrylonitrile and vinyl acetate, copolymers of vinyl chloride and acrylonitrile, and the like. With respect to usable condensation polymers, there may be employed glycerol-maleic acid-linseed oil alkyd resins, phenol-formaldehyde resins, dimerized fatty acid-alkylene diamine polyamide resins, and the like.

A particularly desirable material for use in this invention which provides for air and water-vapor pervious and water absorbent shoe-uppers is one which is formed by compression of a foam with a non-woven fibrous batt by the process and apparatus of this invention. These products are laminate shoe-uppers containing a plurality of layers wherein at least one layer is permanently compressed foam and at least one layer is a substantially non-woven, fibrous batt, preferably in a permanently compressed condition. Such a shoe-upper may be produced by compression, in the aforementioned cavity, of a multi-layer piece containing at least one layer of flexible, substantially open-cell, plastic foam and at least one layer of a substantially non-woven, fibrous batt to a thickness less than 50 percent of the piece while applying sufficient heat to the piece so that when pressure on the piece is relieved, the foam, and preferably the whole piece, retains a compressed state conforming to the shape of the cavity. Preferably, the multi-layer piece undergoing compression has at least one layer of the solid, flexible, substantially open-cell plastic foam in direct contact with at least one layer of a substantially non-woven, fibrous batt.

The resulting compressed shoe-upper comprises a laminated material wherein the non-woven, fibrous batt layer is substantially separable and distinct from the compressed foam layer though each contacts the other. That is, the foam layer is not an integral part of the batt layer. However, considerable amounts of the compressed foam may be associated with the batt layer, having been pressed therein. However, the foam layer does not completely saturate the batt layer. On the other hand, the compressed foam layer is not saturated or is not completely impregnated by the non-woven, fibrous batt. Thus, each of the layers, the compressed foam layer and the non-woven fibrous batt layer, are essentially distinctive and are essentially separably indentifiable.

This facet of the invention provides a shoe-upper possessing enhanced tear strength and tensile strength. For example, it has been found that if the foam is substantially impregnated with the non-woven fibrous batt, or the batt is substantially impregnated with the foam, the resulting compressed product has relatively poor tensile strength and tear strength. By maintaining each layer as a separate identity, though bonded to each other, there results a product which has appreciably enhanced tensile strength and tear strength. These enhanced properties are attained without loss of air and water-vapor perviousness. Moreover, it has been found that the compressed products are significantly absorbent to water and allow transmittance of water through the laminated product but not at such a rate as to provide a product which has essentially no resistance to water passage. The products of this invention may be coated to enhance water imperviousness of the product.

As indicated previously, the laminated compressed foam-batt shoe-uppers contain at least one layer of permanently compressed foam and, preferably, at least one layer of compressed, substantially non-woven, fibrous batt. The layers which make up the laminated material may be associated with each other in a variety of ways. The following list is illustrative of various layer arrangements suitable in making the compressed laminated shoe-uppers. The first described layer will be representative of the uppermost layer, the next layer will be indicative of the second layer in contact with the uppermost layer, and any subsequent layers, as defined in sequence, will follow in contact with the preceding described layers.

(1) The uppermost layer may be the foam layer and the second layer may be a non-woven fibrous batt layer.

(2) The first layer may be a layer of foam, followed by a fibrous batt layer, followed by a foam layer.

(3) The first layer may be a fibrous batt, followed by a foam layer, followed by another layer of batt.

(4) The first layer may be a foam layer, followed by a fibrous batt layer, followed by another foam layer, and then followed by another fibrous batt layer.

(5) The first layer may be a foam layer, followed by a batt layer, followed by another foam layer, then another fibrous batt layer, and finally another foam layer.

(6) The first layer may be a foam layer, followed by another foam layer, and finally by a layer of batt.

(7) The first layer may be foam, followed by two layers of batt in sequence.

(8) The first layer may be foam. followed by two batt layers in sequence, which in turn are followed by a layer of foam.

(9) The first two layers may be foam, followed by two batt layers in sequence.

(10) The first two layers may be foam, followed by two batt layers and then followed by two foam layers.

(11) The first two layers may be batts, followed by a foam layer, then followed by two layers of batt.

(12) The first two layers may be batts, followed by a foam layer, followed by another batt layer.

(13) The first layer may be a fibrous batt, followed by a foam layer, followed by another batt layer, followed by a foam layer, and then followed by an additional batt layer.

(14) The first layer may be a foam layer, followed by a batt layer, followed by another foam layer, followed by an additional batt layer, followed by a further foam layer, followed by a further batt layer, and then followed by an additional foam layer.

A variety of properties may be achieved by varying the manner in which the layers are associated with each other.

The foams which may be employed in making these laminates are those described previously. These foams possess a substantial amount of flexibility and usually can be compressed at room temperature (about 25° C.) to about one-half their thickness. yet rebound to almost all or all of their original thickness when pressure is relieved.

The foams may be utilized per se or may be treated in a variety of ways for usage in making the laminated shoe-upper. For example, the foams may be impregnated with a resinous composition, particularly a thermoplastic resin, which lowers the heat sealing temperature of the foam when it undergoes compression. This results in a lowering of the temperature necessary for effecting manufacture of the desired laminated product. Moreover, the foam may be impregnated with materials which act as a binder between the foam and the batt or between one layer of foam and another layer of foam. A desirable resinous material which may be utilized for these purposes is a poly(vinyl chloride) resin or plastisol composition. Such materials are well known in the art and further discussion with respect to their composition and properties is not necessary.

A surface or surfaces of the foam may be coated with thermoplastic or thermosetting resinous compositions for the purpose of effecting a stronger bond between the coated foam and the batt or batts, or between the coated foam with other layers of foam. Illustrative of such resinous compositions include, poly(vinyl chloride) resins or plastisols, polyacrylic resins such as the alkyl acrylates (e.g., ethylacrylate-2-ethylhexylacrylate copolymers), epoxy resins such as the reaction product of epichlorohydrin and Bisphenol-A, alkyd resins such as oil-modified phthalic or maleic anhydride-glycerol polyester, silicone resins, and the like.

It should be appreciated that the foam usable for forming the laminated shoe-uppers may have varying cell sizes, densities, thicknesses, firmness, perviousness, and the like. Each foam layer of the multi-layer piece may possess different physical properties or be made of a different chemical composition. The foams in making the laminated shoe-uppers may have any one of a variety of shapes, though a sheet-like shape is preferred.

The non-woven fibrous batts typically represent an arrangement of fibers which form a self-supporting batt. The fibers may be held together in the batt by virtue of their distribution therein, by needling the fibers through a matrix such as foam, or by providing a resinous binder in the batt which fixes the fibers. Such batts are well known in the art as illustrated by the following United States Patents: U.S. 2,784.132, issued Mar. 5, 1957; U.S. 2,879,-197, issued Mar. 24, 1959; U.S. 2,734,841, issued Feb. 14, 1956; U.S. 2,757,100, issued July 31, 1956; U.S. 2,858-570, issued Nov. 4, 1958; U.S. 2,994,617, issued Aug. 1, 1961. Preferably, the non-woven fibrous batts employed in this invention are those described in United States Patent Nos. 2,784,132 and 2,879,197.

The most desirable batts are those which are made of non-matted (i.e., uncompressed) fibers which may be drawn or undrawn, and which are arranged in the batt in three dimensions, i.e., in all directions along the length, width and depth of the batt. The three-dimensionally arranged fibers are non-matted (uncompressed) and are typically held against matting by a flexible resinous binder or by needling the randomly-arranged fibers using conventional stitching techniques.

The batt is constructed of a plurality of fibers, preferably synthetic plastic fibers, either straight or curled, which may be of various lengths, e.g., from about ⅛ inch to 4 inches. These fibers are held in a three-dimensional, random arrangement by means of a flexible adhesive or binder, by virtue of the manner they are combined to form the batt, or by needling the fibers, e.g., through a base layer such as foam so that most of the fibers locate on one or both of the surfaces of the base layer.

In making the batt, the individual fibers are first arranged in a three-dimensional, random arrangement and preferably are wetted lightly with binder to cause them to adhere to each other only at their spaced points of contact. The application of binder and the drying thereof is effected without crushing the fibers of the batt. In consequence, the resulting batt is uncompressed and has an unusually high degree of softness and resilience and a very high loft. Although the batt may be handled and cut without any additional material bonded thereto, the application of additional material such as the aforedescribed foams and cloth materials such as cheesecloth and nylon fabrics may be utilized to facilitate the handling of the batt and the cutting thereof. The resulting batt may then be employed in the laminated foam-batt structure of this invention and may be permanently bonded to the foam by providing for an interlayer of adhesive binder between the foam and the batt.

The adherence of the three-dimensional randomly arranged fibers to each other at substantially only their points of contact imparts to the batt and to the laminated materials described in this invention, excellent dimensional stability.

The binder may be any resin which gives a flexible bond between the fibers of the batt. For example, the binder may be such elastic resins as natural or synthetic rubbers. These rubbers may be employed as a latex emulsion. However, most significantly desirable are poly (vinyl chloride) resins are plastisols and polyacrylates such as poly-2-ethylhexylacrylate - ethylacrylate copolymers, as a resin or latex, and the like. The suitably synthetic rubbers include butadiene-styrene copolymers and butadiene-acrylonitrile copolymers. It is desirable that the binder for the batt is one which is reasonably compatible with the binder which may be applied to the surface of the foam or incorporated into the foam. However, this invention does not preclude the use of incompatible binder systems.

The selection of the binder for the batt is not critical to this invention. There may be employed a wide variety of resinous compositions, e.g., vinyl resins and thermoplastic and thermosetting condensation type of resins. For example, there may be employed homopolymers and copolymers of vinyl chloride, vinylidene chloride, vinyl acetate, vinyl alcohol, vinyl butyrate, vinyl propionate, butadiene, acrylic acid esters, and the like. Such homopolymers and copolymers of the vinyl type include, as more specific illustrations, e.g., poly(vinyl chloride) resins and plastisols; poly(vinylidene chloride); copolymers of vinylidene chloride and vinyl chloride; homopolymers of vinyl acetate and copolymers or terpolymers of vinyl acetate and vinyl chloride and/or vinylidene chloride; homo-, co- and terpolymers of polyethylene, polypropylene, and the previously defined vinyl monomers; association products of polyacrylic acids and poly(ethylene oxide); copolymers of maleic acid or maleic acid esters with vinylidene or vinyl compounds such as ethylene, vinyl chloride, vinylidene chloride and/or butadiene, copolymers of butadiene and acrylonitrile, copolymers of acrylonitrile and vinyl acetate, copolymers of vinyl chloride and acrylonitrile, and the like. With respect to usable condensation type polymers, there may be employed glycerol-maleic acid-linseed oil alkyd resins, phenolformaldehyde resins, dimerized fatty acid-alkylene diamine polyamide resins, and the like.

Reference is made to United States Patent Number 2,784,132 for a complete disclosure of preferred nonwoven fibrous batts usable herein. The disclosure of this patent is incorporated herein by reference. It is to be understood that the various resinous binders which are disclosed in United States Patent Number 2,784,132 may be employed in the operation of the instant invention with the advantages related in said patent.

The fibers which may be employed in forming the batts encompass those which are described in U.S. Patent 2,784,132, and include, for example, natural fibers such as hog's hair and cotton or synthetic fibers such as nylon (e.g., polyhexamethylene adipamide, polycaprolactam, and the like); rayon; cellulose triacetate; acrylic fibers such as a copolymer of vinyl chloride and acrylonitrile such as those commercially available under the trademark "Dynel"; fibers essentially formed from polyacrylonitrile and which are commercially available, e.g., under the trademark "Orlon"; polyvinylidene chloride-polyvinyl chloride copolymers such as those commercially available under the trademark "Saran"; polyester fibers such as those from polyethylene terephthalate and which are commercially available under the trademarks "Dacron" and "Terylene"; polypropylene fibers; glass fibers such as those commercially available under the trademark "Fiberglas"; and the like. Usually, the selection of the fiber which makes up the batt is not critical to the invention, though significant results have been obtained from the use of a batt made of drawn polyhexamethylene adipamide (nylon-6,6) fibers. Any of the aforementioned fibers may be employed alone or in admixture with other fibers.

The denier of the fiber is typically not critical to the function of the batt in producing the laminated products; however, it is desirable to utilize fibers having a denier per filament of from 0.5 to 400, preferably from 6 to 100. It is preferred that the fibers employed in making the batt are drawn, that is, have been oriented. However, in some applications, undrawn fibers and filaments have been found suitable.

In a further embodiment, it is desirable to provide a binder in the batt in amounts indicated in United States Patent Number 2,784,132, and thereafter partially or totally drying the batt. The batt containing the binder may then be fed to heated calendar rolls or any heated compressing means whereby to effect a partial or total compression of the batt while finishing setting of the resinous binder. This technique may be repeated a plurality of times, if desired.

Such a technique is most desirable when the resinous binder is a synthetic rubbery polymer in latex form, such as a copolymer of butadiene and acrylonitrile, a terpolymer of butadiene, styrene and acrylonitrile, or a copolymer of butadiene and styrene. After impregnation, the resulting non-woven fibrous batt containing resin may then be squeezed to expel any excess binder and the resulting batt may be placed in a heated oven at a temperature of from obout 75° C. to 175° C. for a period of time to partially dry the resin, typically to a stage where the resin is tacky. Thereafter, the resin-containing batt may be passed through heated calendar rolls, typically at the aforementioned temperatures, and the batt may be compressed, usually not more than 2 percent of its original thickness, and for a period of time sufficient to effect permanent cure of the binder. This technique may be repeated a plurality of times to enhance the strength of the product. Such a material possesses excellent porosity to air and water-vapor and is water absorbent. This material, alone or when associated with the foam as herein described thereby forming a multi-layer piece, is eminently suitable in the formation of a leather substitute by compression of the piece by the shaping process of this invention.

In addition to the aforedescribed permanently extensible material there may also be employed moisture treated leather. Desirably, the leather sheet is treated with steam at a temperature of, for example, from about 70° C. to 90° C. for up to two minutes, preferably from 0.5 to two minutes. Desirably, the leather sample is substantially saturated with moisture. The resultant moisture treated leather may thereafter be shaped into the configuration of the shoe-upper described previously.

Additional permanently extensible material include, reconstituted leather which is typically formed by mechanleather may thereafter be shaped into the configuration ical disintegration of leather into short fibers followed by recombination of the fibers using binders such as those described above as usable in making the batts. Often, the interbonded leather fibrous combination is pressed into flat sheet of the configuration desired for use in this invention. Such a technique may be also used with any of the other natural protenacious fibers, such as those obtained from wool, other animals' hair, e.g., hog's hair, and the like.

Another permanent heat extensible material involves elastomeric and plastic materials which contain therein leachable components suitably dispersed for producing a porous sheet upon a leaching treatment. For example, a sheet of vulcanized rubber, such as a butadiene-styrene rubber copolymer, butadiene-acrylonitrile rubber copolymer, ethylene-propylene elastomer copolymer, and the like, may be admixed with inorganic soluble components such as common salt, potassium chloride, or with soluble organic components, such as organic salts, sugar and starch. The dispersion of these soluble components should be as uniform as possible. In addition, the rubber copolymers should be loaded with vulcanizing agents, e.g., sulfur and sulfur compounds, activators such as zinc oxide, accelerators, stabilizers, anti-oxidants, and the like, to form a vulcanizable gum sheet which when shaped in accordance with this invention, forms a cured elastomer in the shape of a shoe-upper. Plastic sheets such as those made from polyethylene, polytetrafluoroethylene, polystyrene, polyvinylchloride, vinyl acetate copolymers, polyvinylchloride vinylidene copolymers, polypropylene, nylons (e.g., polyhexamethylene adipamide or poly-ε-caprolactam), copolymers of vinyl chloride and acrylonitrile, polyacrylonitrile, and the like, each containing the aforedescribed soluble components dispersed therein, may be used. Such materials are typically thermoplastic and on heat shaping, in accordance with this invention, are capable of forming a shoe-upper of the desired configuration. The resultant shaped rubber or thermoplastic shoe-upper may thereafter be treated with a leaching agent such as water, sulfuric acid, or other liquids capable of dissolving the soluble components, whereby to provide a shoe-upper possessing porosity. Such a technique may be employed to produce shoe-uppers from semi-pervious membranes, as the aforedescribed materials may be so called.

As indicated previously, paper or paper-fabric combinations may be employed for making the shoe-uppers. Paper may be made of conventional cellulosic materials or from synthetic resinous fiber materials, many of which have been described previously. The fabrics may be those which have been described above with respect to utilization of the batts and foams or may be, in itself, a batt-foam combination or simply the batt alone. The paper and fabrics may be laminated by use of the binders described previously.

In addition, leather and fabric laminates may be employed wherein the fabric, such as those described above, is interbonded with the leather using the binders described previously. In addition, it is possible to utilize a leather-fabric combination which has not been interbonded through use of a chemical binder.

Figure 3:
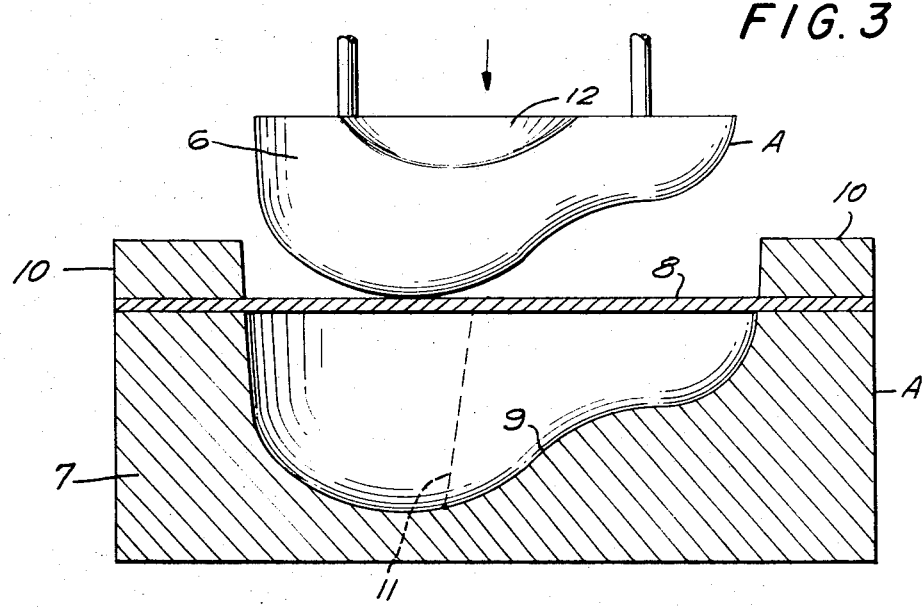
Figure 4:
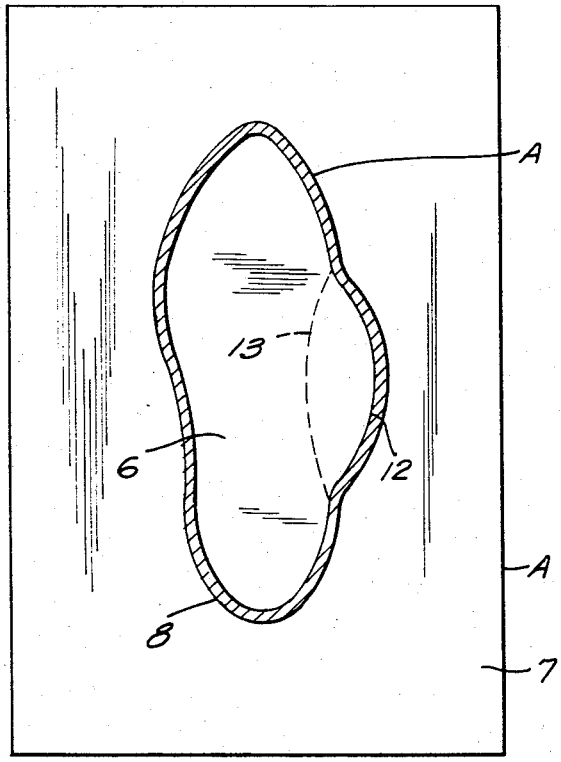

Having described the materials which can be utilized in forming the shoe-uppers of this invention, recourse is now made to FIGURES 3 and 4 of the drawings which serve to illustrate some methods and apparatus for producing the shoe-uppers of this invention.

FIGURE 3 diagrammatically illustrates a partial cross-section side view and full side view of a die-set A comprising female mold 7 and male ram 6. The size of the cavity within mold 7 defined by surface 9 conforms to the configuration of the outer dimensions of ram 6 except that ram 6 has a surface area somewhat smaller than the area of surface 9 so as to allow for the inclusion of extensible sheet 8 into the cavity. Extensible sheet 8 rests upon the upper surface of mold 7 and across the opening to the cavity in mold 7. Imaginary axis 11 starts at the center of the opening to the cavity and extends to the point on surface 9 which represents that point located from the periphery of the opening as the maximum total distance obtainable of all lines extending from the perimeter of the cavity opening to a point on surface 9 of the cavity. The perimeter defined above is characterized in FIGURE 4 as the outer periphery defined by extensible sheet 8 drawn into the cavity of mold 7.

Resting upon the upper surface of sheet 8 is peripherally extending weight 10 which serves the function of assisting in the guidance of sheet 8 into the cavity of mold 7 upon lowering of ram 6 into the cavity. The presence of weight 10 is not critical to the operation of this process and is mainly an additional embodiment which, in many instances, facilitates the operation of this process. In addition, weight 10 need not extend about the total periphery of sheet 8. In many cases, it will be sufficient to provide weight 10 only about the heel portion of sheet 8. That is, the weight is desirably provided on that portion of the material which will provide the side wall in the vicinity of the heel of the shoe-upper.

With respect to FIGURE 4, there is illustrated a top view of die-set A wherein ram 6 is injected into the cavity of mold 7, thus illustrating the compressive action of ram 6 upon the sheet material A to conform it to the shoe-upper shape of the die-set. Illustrated in FIGURE 4, as well as in FIGURE 3, is inverted arch 12 as described previously as being distinguishable from the conventional arch as illustrated by the dotted line 13 depicting the conventional arch contour. FIGURE 3 illustrates the non-re-entering angle configuration of arch 12 to ram 6. This has been previously described with respect to arch 4' of FIGURE 2.

As a rule, it is necessary to heat-set extensible sheet 8 into the configuration of a shoe-upper. Most permanently extensible materials are heat-set at a temperature of at least about 50° C. In most instances, it is not necessary to heat-set at a temperature in excess of about 500° C. In the usual case, the temperature necessary to effect heat-setting is correlated with the time employed in conforming or shaping the extensible material into the shape of a shoe-upper. Lower temperatures are usually employed when longer periods of time are used in the heat-shaping step. For example, in the case of substantially all the materials described previously, if heat-shaping is effected in less than ten minutes but for longer than one minute, the temperature employed is usually not in excess of 250° C. As a rule it is desirable to heat-shape the shoe-upper within about one second up to about five minutes or slightly more. At heat-shaping periods of from about one minute or less, it is usually desirable to employ a temperature typically of at least about 150° C. Of course, it should be understood that the operative temperature is dependent upon the operative permanently-extensible material employed.

Ram 6 and mold 7 of die-set A may be made of any operative solid, non-extensitle material. Preferred non-extensible materials for use in this invention are castable metals, including castable metal alloys. Desirable metals include cast-iron, steel, stainless steel, aluminum, brass, copper, nickel, etc., and their alloys. Particularly preferred is aluminum.

The interiors of ram 6 and mold 7, other than the cavity possessing surface 9, may be hollow or solid. The interiors may contain steam piping or electric heaters (cartridge heaters) or other electric resistors for generating heat. Such heating means represent simple methods for bringing the extensible material to the desired temperature for heat-shaping.

Though the shaping of the shoe-upper has been specifically defined with respect to employment of a ram to achieve the force necessary to conform the extensible material to the shape of the cavity, other techniques suitable for applying such a force may be employed. For example, there may be provided over sheet 8 of FIGURE 3 an additional non-pervious extensible material, such as a thermoplastic such as polyethylene, polypropylene, polyvinylchloride, and the like, in sheet form. This latter sheet is provided on the surface of sheet 8 not facing surface 9 of the cavity. Mold 7 may, in this case, be provided with a vacuum forming mechanism as is conventional in the art in the vacuum molding of plastic articles. Upon creation of a vacuum in the cavity of mold 7, sufficient force is effected to cause sheet 8 in contact with the thermoplastic (non-air-pervious) sheet to be drawn into the cavity of mold 7 in the configuration of the shoe-upper as defined by the cavity.

It is reiterated that mold 7 may be provided with heating means sufficient to achieve heat-setting as defined previously. Such heating means include incorporation in mold 7 of steam or forced air heated coils or electric cartridge heaters. The displacement of these coils should be sufficient to provide substantially uniform distribution of heat along surface 9 of the cavity.

The following examples illustrate specific operations to which this invention is not intended to be limited.

*Example 1*

Using an aluminum die-set A as described in FIGURES 3 and 4, wherein the cavity in mold 7 and ram 6 is in the shape of a shoe-upper equivalent to a man's shoe size 9–D, there was employed, as extensible sheet 8, two ½-inch thick, 20 x 12 inches rectangular sheets of foam sandwiched about a non-woven fibrous batt containing 2.5 ounces per square yard of drawn, 15-denier filament nylon 66 (polyhexamethylene adipamide) impregnated with 1.0 ounce (dry-weight) per square yard of poly(vinyl chloride) binder. The foam was a polyurethane foam made from the reaction of tolylene diisocyanate and a 1,2-propylene oxide-glycerol adduct having a hydroxyl number of 56. The batt was interbonded with the foam using 1.0 ounce (dry-weight) per square yard of dried resinous copolymer of vinyl acetate and 2-ethylhexylacrylate. Ram 6 and mold 7 were each heated to 190° C. by electric cartridges inserted in the hollow of each. As ram 6 was lowered, it contacted the sandwich and pushed it into the cavity of mold 7. The clearance between the surface of ram 6 and surface 9 was 0.0625 inch. Upon full insertion into the cavity, the sandwich was compressed to 0.0625 inch in thickness. After three minutes of compression in the cavity, ram 6 was raised to provide a compressed foam-batt laminate having porosity to air and water-vapor and absorbency to liquid-water. The laminate was in the shape of a shoe-upper as characterized in FIGURE 2, having an inverted arch. Upon fitting the shoe-upper on a conventional shoe-last (possessing an innersole in the sole position) of a man's size 9–D, the open end of the shoe-upper was forced over the sole portion of the last and sealed to the innersole to form a shoe-upper possessing the conventional re-entry arch shape.

The above procedure was re-employed using, however, as the extensible material, moistened leather. A most desirable looking shoe-upper was formed.

The ankle opening or instep of the shoe-upper may be formed by cutting the upper with scissors or by pressing a heated coil on the portion of the molded shoe-upper normal for such an opening. Other methods of providing the opening may be employed, for example, such as by use of a cutting device equivalent to a cookie cutter or the like. The molded shoe-upper can have a plurality of shoe-upper details and shapes, for example, it may have the design of a simple slip-on or a slip-on with a design that looks like a wrap-over vamp, oxford design, simulated ornamentation such as a vamp step over the shoe-upper, a brogue look, or moccasin design, with any kind of surface characteristic.

Though the above has described the invention with respect to a plurality of details, such are not to be construed as limiting the scope of this invention unless such details are set forth in the appended claims.

What is claimed is:

1. A process for the production of a shoe-upper which comprises providing at least a portion of a surface of a sheet of solid, heat-set extensible material over at least a substantial portion of the opening of an essentially concave cavity having the shape of a shoe-upper and being defined by surfaces of solid, non-extensible material, said cavity having an axis determined as that line extending from the center of the opening to a point on the surface of the cavity, which point is determined as the maximum total distance obtainable of all lines extending from the perimeter of the opening to a point on the surface of the cavity, the surfaces of said concave cavity being defined by said solid, non-extensible material extending from said point in a direction lateral of said axis and thereafter rising to the perimeter of said opening in a direction incapable of intersection with said axis so as to form the reverse shape of the arch of said shoe-upper, applying sufficient force to said sheet to cause said sheet to conform to the configuration of said cavity and heating said sheet in said conformed state, said heat being of sufficient intensity and being applied for a sufficient time to heat-set the sheet so that upon withdrawal of said sheet from said cavity, said sheet retains the shape of a shoe-upper defined by said cavity, and then reversing said reverse arch shape to provide an indented arch portion of said shoe upper.

2. The process of claim 1 wherein the extensible material is leather.

3. The process of claim 1 wherein the extensible material comprises a foam said conforming force being sufficient to compress said foam permanently.

4. The process of claim 1 wherein the extensible material comprises a non-woven fibrous batt.

5. The process of claim 1 wherein the extensible material comprises at least one layer of foam in contact with at least one layer of non-woven fibrous batt.

6. The process of claim 3 wherein the foam is a flexible polyurethane foam.

7. The process of claim 1 wherein the extensible material, during conformation to the configuration of said cavity, has a temperature between about 150° C. and about 500° C.

References Cited

UNITED STATES PATENTS

| | | | |
|---|---|---|---|
| 1,764,215 | 6/1930 | Kupper | 18—19 XR |
| 2,582,298 | 1/1952 | Ushakoff | 12—146 |
| 2,784,132 | 3/1957 | Maisel | 161—170 |
| 2,879,197 | 3/1959 | Muskat et al. | 264—45 XR |
| 2,904,838 | 9/1959 | Phillips | 12—146 XR |
| 2,973,558 | 3/1961 | Stratton | 264—90 XR |
| 3,054,714 | 9/1962 | Johnston | 264—90 XR |
| 3,137,747 | 6/1964 | Kline | 264—321 XR |
| 3,234,065 | 2/1966 | Best | 264—321 XR |

FOREIGN PATENTS

| | | |
|---|---|---|
| 582,122 | 8/1959 | Canada. |
| 2,453 of 1888 | 1/1889 | Great Britain. |
| 5,607 of 1883 | 12/1883 | Great Britain. |
| 826,012 | 12/1959 | Great Britain. |
| 9,154 | 11/1897 | Sweden. |
| 215,516 | 9/1941 | Switzerland. |

ALEXANDER H. BRODMERKEL, *Primary Examiner.*

P. E. ANDERSON, *Assistant Examiner.*

UNITED STATES PATENT OFFICE
CERTIFICATE OF CORRECTION

Patent No. 3,355,535　　　　　　　　　　　　November 28, 1967

Elias W. R. Hain et al.

It is hereby certified that error appears in the above numbered patent requiring correction and that the said Letters Patent should read as corrected below.

Column 5, line 34, for "oxaylkylene" read -- oxyalkylene --; column 8, line 52, for "themally" read -- thermally --; column 11, line 59, for "foam." read -- foam, --; column 13, line 34, for "are" read -- or --; column 14, line 53, for "obout" read -- about --; column 15, line 5, strike out "leather may thereafter be shaped into the configuration"; column 16, line 62, for "non-extensitle" read -- non-extensible --.

Signed and sealed this 15th day of April 1969.

(SEAL)
Attest:

Edward M. Fletcher, Jr.　　　　　　　　　　　EDWARD J. BRENNER
Attesting Officer　　　　　　　　　　　　　　Commissioner of Patents